Patented May 6, 1930

1,757,588

UNITED STATES PATENT OFFICE

ROBERT C. PALMER, JOHN L. BURDA, AND ANTHONY F. OLIVER, OF PENSACOLA, FLORIDA, ASSIGNORS TO THE NEWPORT COMPANY, OF CARROLLVILLE, WISCONSIN, A CORPORATION OF DELAWARE

PROCESS OF PURIFYING ROSINS

No Drawing. Application filed January 16, 1928. Serial No. 247,255.

This invention relates to a method of purifying and decolorizing rosin containing material with phenolic solvents by using in addition to the phenolic solvent an acid reacting substance capable of assisting in the extraction of the impurities and coloring matters.

In a copending application of Robert C. Palmer and John L. Burda, Serial No. 186,587 filed February 7, 1927, entitled "A process of purifying rosins", there has been described a process for purifying and decolorizing rosins by extracting the impurities and coloring matters by means of a phenolic solvent, preferably phenol. Also in a copending application of Ivan Gubelmann and Clyde O. Henke, Serial No. 208,407 filed July 25, 1927, entitled "A process of purifying and decolorizing rosin with resorcinol", there has been described a process of purifying and decolorizing rosins by the use of a phendiol, namely resorcinol.

We have found in general that in employing the phenolic solvents such as phenols, phendiols and the like as decolorizing agents for the purification of rosin containing material, such as an extraction mass of wood rosin in a rosin solvent, that the specific action of these phenolic solvents may be remarkably increased if a small amount of an acid reacting material is added to the phenolic solvents.

By using even small amounts of the acid reacting material in connection with the phenolic solvents, we are able to obtain even higher grades of rosin than have been possible by the use of the disclosed methods above mentioned.

We have likewise found that the increase in specific action of the phenolic solvent by the addition of the acid reacting material takes place in the presence of any of the large variety of usual rosin solvents, as for instance light petroleum distillates and other aliphatic hydrocarbons. This increased action has been shown to take place in the use of any of the general class of phenolic solvents, as for example phenols, the phendiols, as for example resorcinol, and the phentriols as for example, pyrogallol. In our present invention, we do not wish to limit our method to any particular crude grade of rosin as starting material, for we have found that similar results are obtained by starting either with an inferior grade of rosin as such or by starting with an extraction mass as it is obtained by extracting finely comminuted woods with the usual rosin solvents.

In general we have used a large variety of acids to effect the increased solvent power of the phenolic solvents. We have used both inorganic and organic acids. A few of the acids used are as follows: sulfuric, phosphoric, acetic, oxalic, salicylic, citric, and tartaric. Our only limitation on the acid used is that it must have no detrimental chemical action on the rosin, or on the phenolic solvent or the rosin solvent, in the quantities used. Whereas it is possible to use almost any of the acid reacting materials, we prefer to use oxalic acid, as it appears to us to be more economically practicable.

Examples

I. Using phenol and oxalic acid.

In employing phenol as the rosin decolorizing reagent, we add a saturated alcoholic solution of oxalic acid to phenol in an amount equal to 0.2 of 1% of the rosin to be treated and the acidified phenol is then used for decolorizing a solution of rosin in petroleum naphtha. A concentrated solution of about 80 to 85% phenol containing the oxalic acid is added to the rosin solution in an amount equal to from 1 to 3% of the volume of the rosin solution. The whole is then warmed to about 25° C. or until the phenol has effectively dissolved. The mixture is then cooled to a temperature that will throw the excess phenol out of solution and thereby form two layers, but above the temperature at which the phenol solution begins to solidify. The phenol layer containing the impurities is now drawn away, and the purified rosin recovered from the rosin solution.

The purified rosin is from one to two grades better than if a neutral phenol had been used. The oxalic acid is not recovered for re-use.

II. Using resorcinol and oxalic acid.

In using resorcinol as the rosin decolorizing agent, we add solid oxalic acid to resorcinol prior to fusion and addition to the rosin extraction mass in amount equal to 1% of the rosin to be treated and the thus acidified resorcinol is used for decolorizing the rosin.

To a solution of 2000 parts of rosin extract are added 52½ parts of the resorcinol containing 2½ parts of oxalic acid and the resulting mixture heated to boiling with efficient agitation. The mixture is then cooled to ordinary or low temperature with thorough stirring. There results a solution of purified rosin and a precipitated mass from which the rosin solution may be decanted. Any resorcinol and oxalic acid dissolved in the rosin solution is separated by extraction with water.

The precipitated mass contains most of the resorcinol and oxalic acid, which is heated with boiling water to extract the resorcinol and acid practically completely.

The combined resorcinol-oxalic acid water solutions are evaporated in a still, leaving as a residue, a resorcinol-oxalic acid mixture suitable for re-use in subsequent operations. Thus after once adding oxalic acid to resorcinol, the resorcinol remains in an activated acidic condition. The rosin is recovered from the rosin solvent solution by the usual method and is from one to two grades better than if a neutral resorcinol had been used. For example, an M grade rosin may be secured by this method.

We are aware that many changes may be made and numerous details of the process may be varied through a wide range without departing from the principles of this invention and we, therefore, do not purpose limiting the patent granted hereon, otherwise than necessitated by the prior art.

We claim as our invention:

1. The process of decolorizing rosins, which comprises treating a solution of impure rosin in a relatively volatile hydrocarbon with a phenolic body previously acidified with a relatively small quantity of an acid chemically inactive towards the constituents of the solution to extract the impurities, separating the phenolic body containing dissolved impurities and recovering the purified rosin from the rosin solution.

2. In the process of decolorizing rosins, the step which comprises treating a solution of impure rosin dissolved in a relatively volatile hydrocarbon with a phenolic body previously acidified with a relatively small quantity of an acid chemically inactive towards the constituents of the solution.

3. In the process of decolorizing rosins, the step which comprises treating a solution of impure rosin dissolved in a petroleum distillate with a phenolic body previously acidified with a relatively small quantity of oxalic acid.

4. In the process of decolorizing rosins, the step which comprises treating a solution of impure rosin in petroleum naphtha with resorcinol previously acidified with oxalic acid.

5. In the process of decolorizing rosins, the step which comprises treating a solution of impure rosin in petroleum naphtha with resorcinol previously acidified with oxalic acid in an amount equal to about 1% of the rosin to be treated.

6. In the process of decolorizing rosins, the step which comprises treating a solution of impure rosin with a phenolic body previously acidified with a relatively small quantity of an acid chemically inactive towards the constituents of the solution.

In testimony whereof we have hereunto subscribed our names at Pensacola, Escambia County, Florida.

ROBERT C. PALMER.
ANTHONY F. OLIVER.
JOHN L. BURDA.